(12) United States Patent
Wang

(10) Patent No.: US 10,931,803 B2
(45) Date of Patent: Feb. 23, 2021

(54) MOBILE PHONE BRACKET WITH LIFTABLE PANEL

(71) Applicant: Shenzhen Xgear Technology Co., Ltd., Guangdong (CN)

(72) Inventor: Jie Wang, Guangdong (CN)

(73) Assignee: Shenzhen Xgear Technology Co., Ltd., Shenzhen (CN)

( * ) Notice: Subject to any disclaimer, the term of this patent is extended or adjusted under 35 U.S.C. 154(b) by 0 days.

(21) Appl. No.: 16/882,528

(22) Filed: May 24, 2020

(65) Prior Publication Data

US 2020/0374380 A1 Nov. 26, 2020

(30) Foreign Application Priority Data

May 25, 2019 (CN) .......................... 2019 2 0763210.4

(51) Int. Cl.
*H04M 1/00* (2006.01)
*H04M 1/06* (2006.01)

(52) U.S. Cl.
CPC .................................... *H04M 1/06* (2013.01)

(58) Field of Classification Search
CPC ............. H04M 1/0214; H04M 1/0227; H04M 1/0233; H04M 1/0235; H04M 1/0237; H04M 1/0216; H04M 1/0243; H04M 1/0245
See application file for complete search history.

(56) References Cited

U.S. PATENT DOCUMENTS

| | | | | |
|---|---|---|---|---|
| 7,174,195 B2* | 2/2007 | Nagamine | ........... | H04M 1/0243 455/575.1 |
| 7,194,290 B2* | 3/2007 | Matsunami | ......... | H04M 1/0235 348/333.06 |
| 7,599,487 B2* | 10/2009 | Lim | ..................... | H04M 1/0237 379/433.12 |
| 8,077,854 B2* | 12/2011 | Ou | ........................ | G06F 1/1681 379/330 |
| 8,108,015 B2* | 1/2012 | Sakashita | ............ | H04M 1/0216 455/575.3 |

FOREIGN PATENT DOCUMENTS

CN 208723973 U 4/2019

* cited by examiner

*Primary Examiner* — Nhan T Le

(57) ABSTRACT

The invention relates to an auxiliary product of a mobile phone or a tablet personal computer, in particular to a mobile phone bracket with a liftable panel, including a front support plate and a rear support plate, wherein the front support plate and the rear support plate are rotationally connected, and the back surface of the front support plate is provided with a stowing groove adapted to the rear support plate in shape and size. When stowed, the rear support plate trapped into the stowing groove. The front surface of the front support plate is in sliding connection with a mobile phone receiving platform which is S-shaped, and the mobile phone bracket is provided with a locking structure to lock the mobile phone receiving platform to prevent sliding. The mobile phone bracket has an ingenious structure, is convenient to fold and unfold, and has excellent user experience.

10 Claims, 7 Drawing Sheets

MOBILE PHONE BRACKET WITH LIFTABLE PANEL

CROSS REFERENCE TO RELATED APPLICATIONS

The present application claims the benefit of Chinese Patent Application No. 201920763210.4 filed on May 25, 2019, the contents of which are incorporated herein by reference in their entirety.

TECHNICAL FIELD

The present invention relates to an auxiliary product of a mobile phone or a tablet personal computer, in particular to a mobile phone bracket with a liftable panel.

BACKGROUND

With the development of society, mobile phones and tablet personal computers have more and more powerful functions, and gradually replace laptops in many aspects such as document processing, stock trading, music, film and television playing; and mobile phones and tablet personal computers already become daily essential electronic products for young people because of constantly introduced new functions, especially mobile phones, nowadays already become electronic products that must be used all the time, so more and more people become heavily-dependent users of mobile phones. However, when a person holds a mobile phone or a tablet personal computer in hand to watch a movie for a long time, it may cause great inconvenience and may make his/her hand tired easily. Therefore, brackets of mobile phones and tablet personal computers are produced accordingly. The existing bracket of a mobile phone or tablet personal computer is mainly composed of three parts, that is, the first part is a clip used to clamp the mobile phone or tablet personal computer, the second part is a fixing base used to fix the bracket to other objects (for example, attracted on a table or clamped on a tabulate object), and the third part is a connecting structure used to connect the clip and the fixing structure. In order to meet the requirements of height adjustment, foldable or retractable connecting rods are used as connecting structures at present, but foldable connecting rods are complicated to adjust and are easily damaged, and still occupy large space after folded, thus being inconvenient to move. Therefore, someone studied a bracket which can be placed on the table and can be folded, for example, the Chinese invention with the publication number CN208723973U discloses a folding mobile phone bracket, mainly comprising a connecting block, a mobile phone clamping groove, a baffle plate, a mobile phone support plate, a connecting block, a hinge device, a pushing plate, and a mobile phone bracket angle adjustment device. A folding mobile phone bracket of the invention is structurally provided with a mobile phone bracket angle adjustment device, a knob is embedded in the mobile phone bracket angle adjustment device, a threaded rod is driven to rotate by rotating the knob, so a threaded sleeve is driven to move by the rotation of the threaded rod, a pushing block is driven to move by the movement of the threaded sleeve, and then the pushing plate is driven to move by the movement of the pushing block to push the mobile phone support plate to move; meanwhile, a helical gear is driven to rotate by the rotation of the threaded rod, the helical gear rotates and is engaged with a second helical gear, so that a rotating disk is driven to rotate by the rotation of the second helical gear through a transmission rod, and the pushing block is driven to move by the rotation of the rotating disk through a rope. The angle of the mobile phone bracket can be adjusted by the mobile phone bracket angle adjustment device, thereby improving the use comfort of the mobile phone bracket. However, in the structure, the threaded rod is driven to rotate by rotating the knob, the threaded sleeve is driven to move by the rotation of the threaded rod, the pushing block is driven to move, and then the mobile phone support plate is pushed to move, so the structure is complicated and the movement is too complicated. At the same time, such movement of threads and gears drives the movement of various structures, causing easy damage and low service life.

SUMMARY

The purpose of the present invention is to overcome the above disadvantages and defects in the prior art, and provide a mobile phone bracket with liftable panel.

The purpose of the invention is realized by the following technical solution: A mobile phone bracket with a liftable panel, including a front support plate and a rear support plate, wherein the front support plate and the rear support plate are rotationally connected, and the back surface of the front support plate is provided with a stowing groove adapted to the rear support plate in shape and size. When stowed, the rear support plate is trapped into the stowing groove. The front surface of the front support plate is also superimposed with a mobile phone receiving platform which is S-shaped, the mobile phone receiving platform is in sliding connection with the front support plate, and the mobile phone bracket is provided with a locking structure which can lock the mobile phone receiving platform to prevent sliding. In the invention, the back surface of the front support plate is provided with a stowing groove, and the rear support plate is trapped in the stowing groove when stowed. In this way, when the rear support plate is stowed, the entire back surface of the mobile phone bracket may form a flat whole, reducing the occupied space. The front support plate is provided with an S-shaped mobile phone receiving platform, the mobile phone receiving platform is in sliding connection with the front support plate, and the S-shaped mobile phone receiving platform may be slid upward or downward along the front support plate, so that the mobile phone is raised or lowered in height. Moreover, for the existing smart mobile phone, because the charging interface thereof is substantially provided at the bottom of the mobile phone, when the mobile phone is raised in height, a space is formed for the charging line to be smoothly inserted into the charging hole of the mobile phone. The mobile phone bracket is provided with a locking structure which can lock the mobile phone receiving platform to prevent sliding, and the S-shaped mobile phone receiving platform is locked at a required height, facilitating adjustment.

Another preferred solution of the invention is: based on the above solution, when the rear support plate is opened, an included angle formed by the front support plate and the rear support plate is less than or equal to 90 degrees. In this way, if the angle formed by the front support plate and the rear support plate when opened is set to less than or equal to 90 degrees, the force on the junction between the front support plate and the rear support plate when opened can be reduced. If the angle is too large, the force arm may become shorter and the destructive force on the junction may become larger, which may easily cause damage to the junction.

Another preferred solution of the invention is: based on the above solution, an upper end head of the front support plate is arc-shaped. Because the upper end head of the front support plate is arc-shaped and matches the upper end of the S-shaped mobile phone receiving platform in shape, when the S-shaped mobile phone receiving platform is slid downward to the lowest point, the upper end of the S-shaped mobile phone receiving platform is attached to the upper end of the front support plate, improving the bearing capacity of the S-shaped mobile phone receiving platform, and making the entire bracket smoother and more beautiful.

Another preferred solution of the invention is: based on the above solution, a lower end head of the front support plate is arc-shaped. Because the lower end head of the front support plate is arc-shaped, when the rear support plate is opened, regardless of the size of an angle, it can ensure the same area of contact with the table top, overcoming the problem of easy toppling due to the change in the area of contact with the table top when the angle changes.

Another preferred solution of the invention is: based on the above solution, an upper end head of the rear support plate is arc-shaped. Because both the upper end of the front support plate and the upper end of the rear support plate are arc-shaped, the front support plate and the rear support plate are rotationally connected by a rotating shaft, so that the use is convenient, and the upper end of the entire bracket is smooth and flat when stowed.

Another preferred solution of the invention is: based on the above solution, the rear support plate is gradually decreased in thickness from the upper end to the lower end; and the corresponding stowing groove in the back surface of the front support plate is gradually decreased in depth from the upper end to the lower end. In this way, the lower end of the front support plate can be provided with a thicker counterweight, because the S-shaped mobile phone receiving platform is connected to the front support plate, and the thicker lower end of the front support plate can provide sufficient support for the mobile phone, can reduce the center of gravity of the entire front support plate, and can make the front support plate more stable when in use. Even when the mobile phone receiving platform is slid upward to the highest point, the entire mobile phone bracket is stable.

Another preferred solution of the invention is: based on the above solution, the front surface of the front support plate is provided with a sliding groove, the shape of each of both ends of the sliding groove is oval or square, the shape of the middle section is rectangle, and the lateral distance between the two ends of the sliding groove is greater than the width of the rectangle.

Another preferred solution of the invention is: based on the above solution, the mobile phone receiving platform is provided with a locking rod which cooperates with the sliding groove, slides in the sliding groove, and locks when sliding to the two ends of the sliding groove.

In this way, because the locking rod cooperates with the sliding groove, and each end head of the locking rod is larger than the main body of the locking rod, when the end heads of the locking rod are placed at both ends of the sliding groove, that is, clamped in the two end heads of the grooves, if the end heads of the locking rod are separated from the end heads of the sliding groove, the locking rod can slide along the rectangular middle section of the sliding groove to realize sliding and locking.

Another preferred solution of the invention is: based on the above solution, a coil for wireless charging is provided in the mobile receiving platform. The provided coil for wireless charging can be used to charge the mobile phone with a wireless charging function, avoiding the fetter of a charging line, and reducing accidents of toppling of the mobile phone or the bracket.

DETAILED DESCRIPTION

Some preferred embodiments of the invention are provided below in order to further understand the invention.

Embodiment 1

Figure 1:
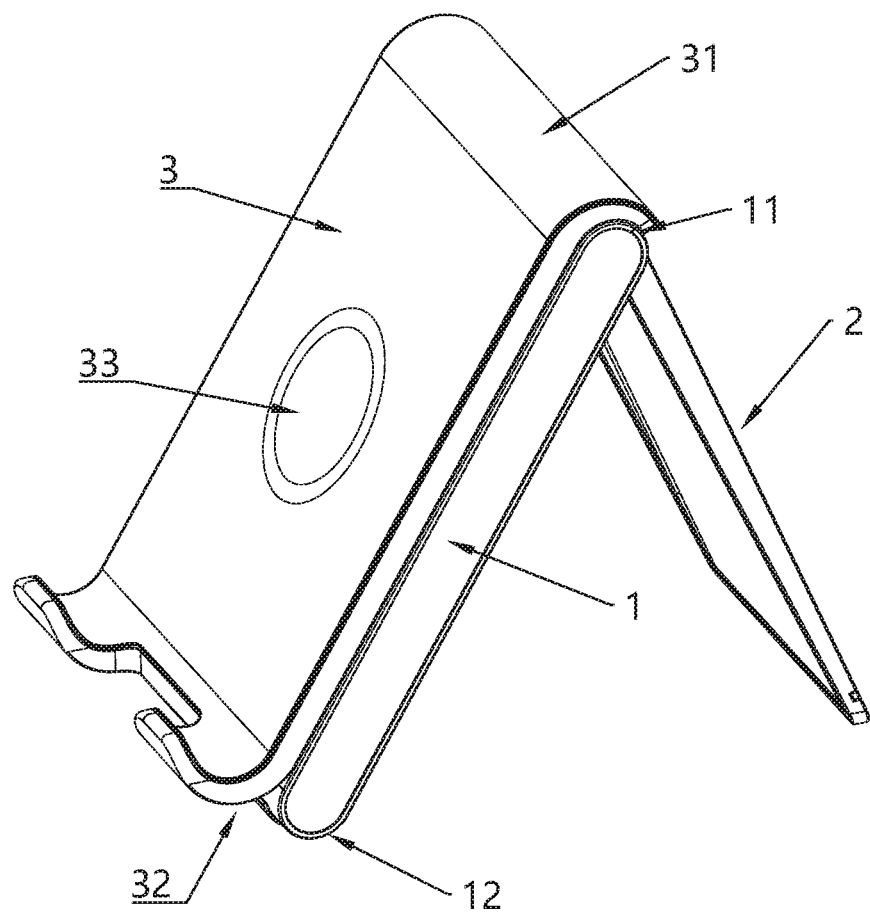
FIG. 1 is an external structural schematic diagram of a mobile phone bracket in embodiment 1 of the invention.
Figure 2:
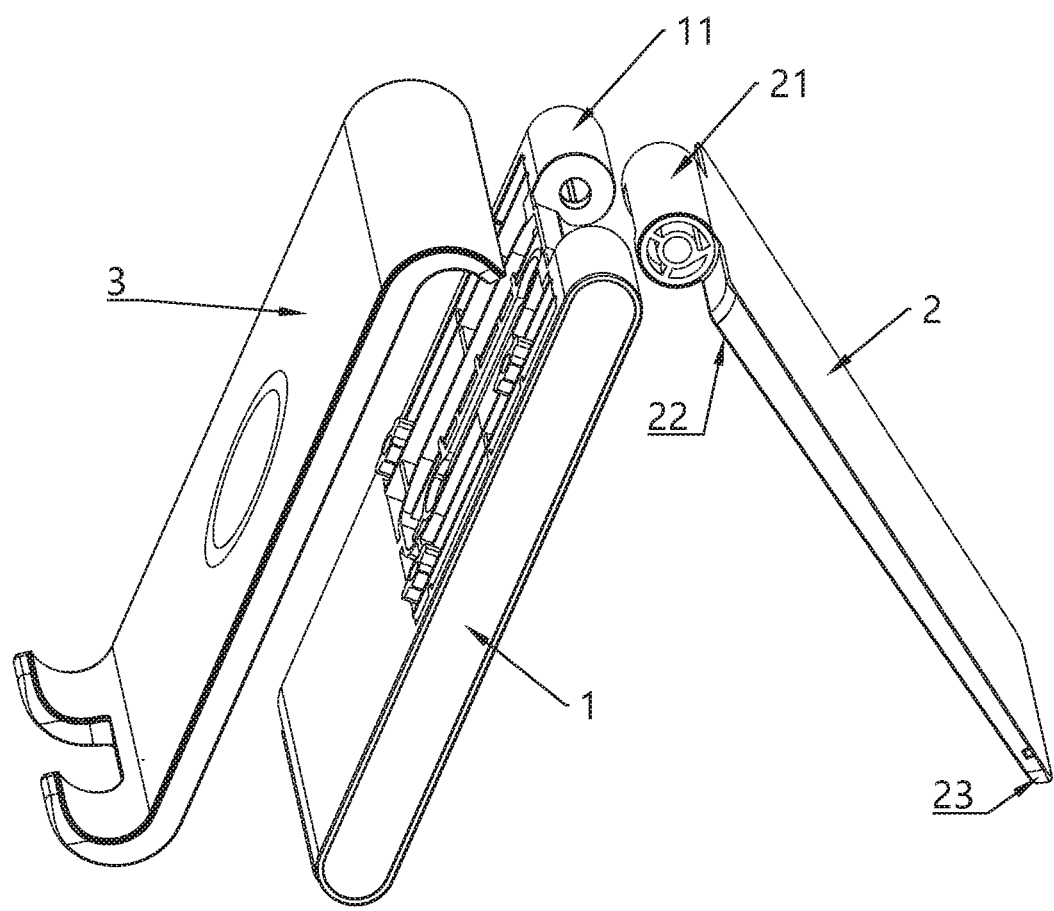
FIG. 2 is an exploded structural schematic diagram of a mobile phone bracket in embodiment 1 of the invention.
Figure 5:
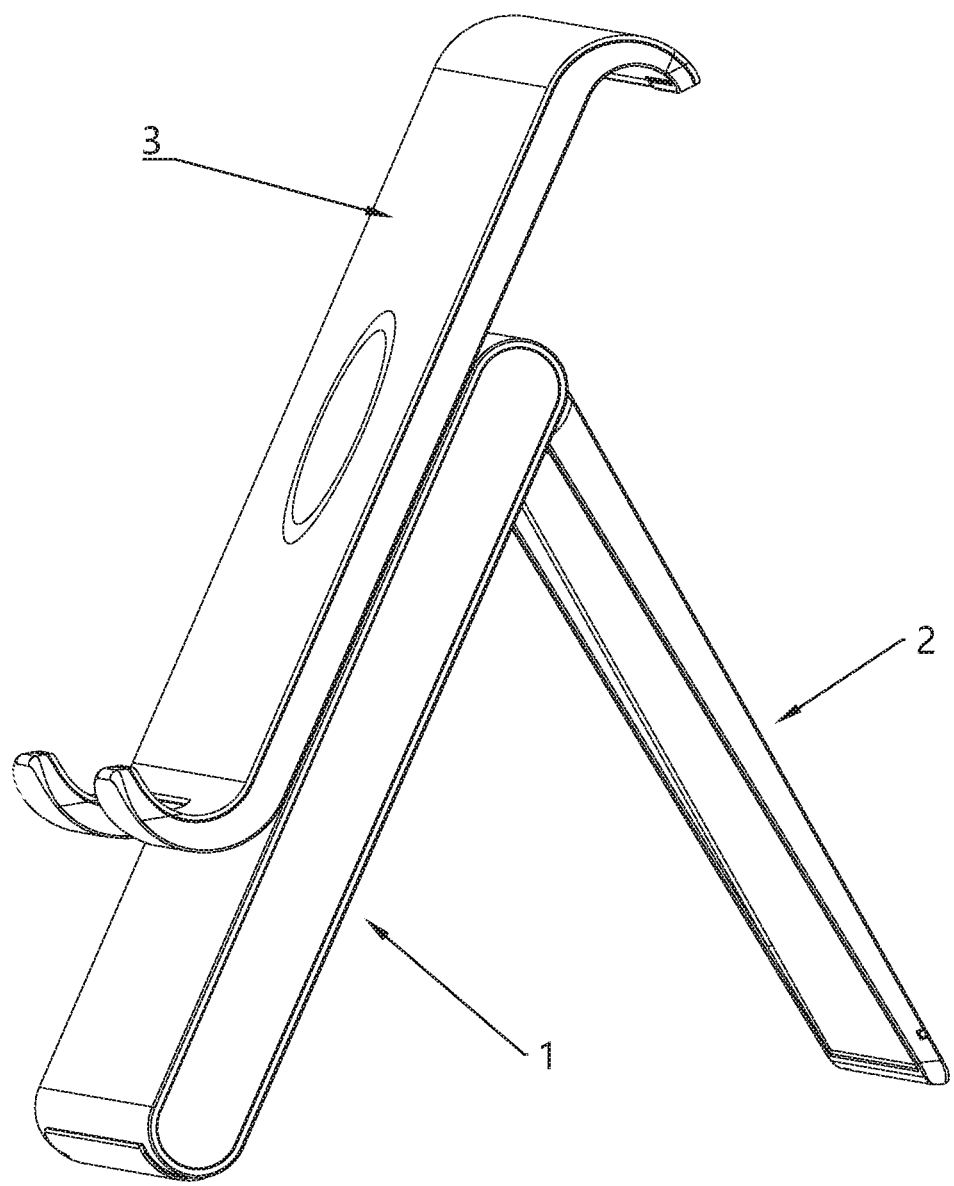
FIG. 5 is a structural schematic diagram of a mobile phone bracket in an opening state in embodiment 1 of the invention.
Figure 6:
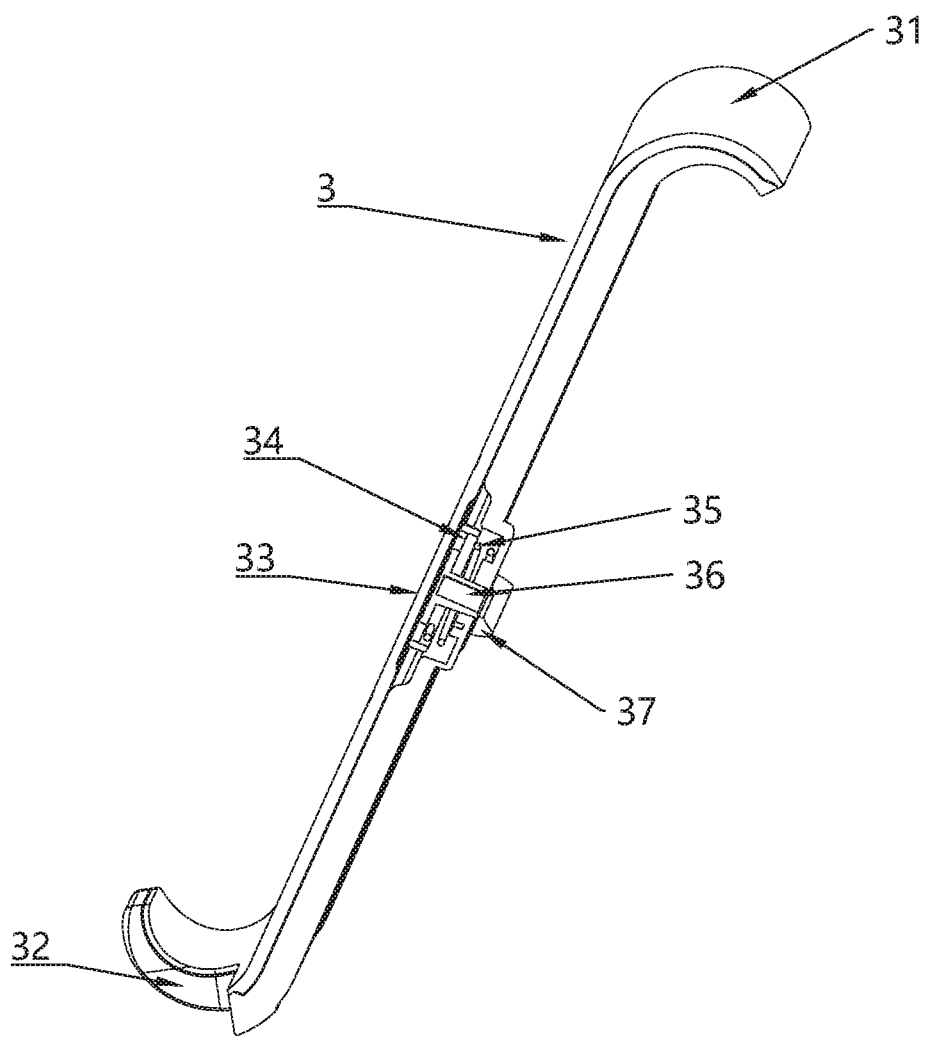
FIG. 6 is a structural schematic diagram of a longitudinal section along a midpoint of a mobile phone receiving platform in embodiment 1 of the invention.
Figure 7:
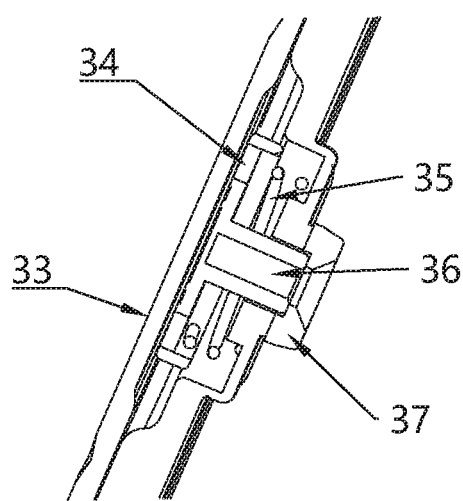
FIG. 7 is a structural schematic diagram of an amplified section of a pressing area of a mobile phone receiving platform in embodiment 1 of the invention.

As shown in FIGS. 1 and 2, a mobile phone bracket with a liftable panel, including a front support plate 1 and a rear support plate 2, wherein the front support plate and the rear support plate are rotationally connected, and the back surface of the front support plate is provided with a stowing groove 15 adapted to the rear support plate in shape and size. When stowed, the rear support plate is trapped into the stowing groove. The front surface of the front support plate is also superimposed with a mobile phone receiving platform 3 which is S-shaped, and the mobile phone receiving platform is in sliding connection with the front support plate. As shown in FIG. 5, the mobile phone bracket can slide along the front support plate. FIG. 5 is a structural schematic diagram of a mobile phone receiving platform sliding to the highest point. The mobile phone bracket is also provided with a locking structure which can lock the mobile phone receiving platform to prevent sliding. When the rear support plate is opened, an included angle formed by the front support plate and the rear support plate is less than or equal to 90 degrees.

Figure 3:
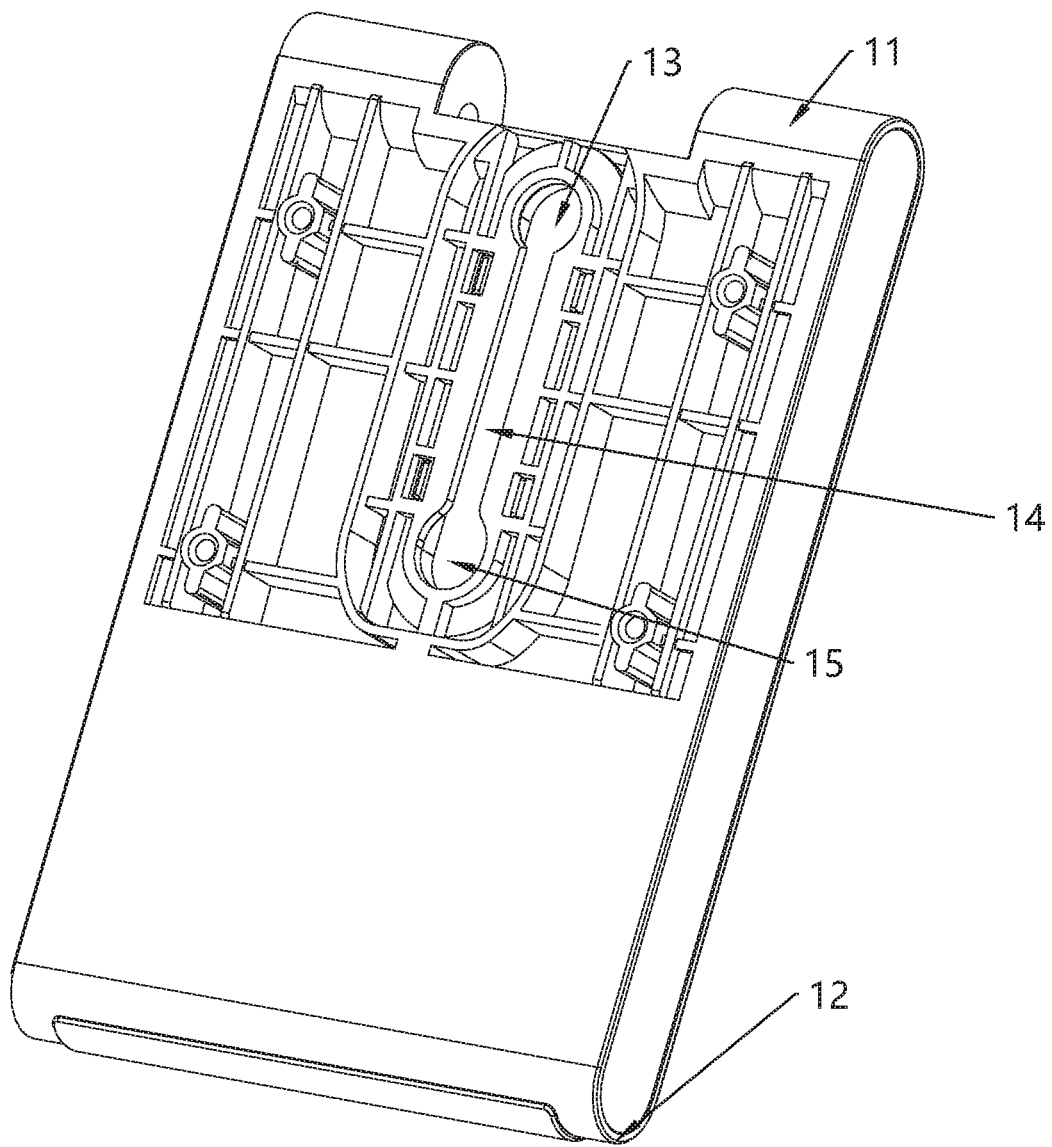
FIG. 3 is a front structural schematic diagram a front support plate in embodiment 1 of the invention.

As shown in FIGS. 1, 2, and 3, an upper end head 11 of the front support plate in this embodiment is arc-shaped. A lower end head 12 of the front support plate is arc-shaped, and a notch is provided in the middle of the lower end 12 of the front support plate to facilitate the charging line to pass through and then charge the mobile phone. As shown in FIG. 2, an upper end head 21 of the rear support plate is arc-shaped. The upper end head of the rear support plate may be embedded in the upper end head of the front support plate, and then the two upper ends may be connected by a rotating shaft from the middle, to rotate around the rotating shaft when in use, so that the front support plate and the rear support plate are combined and separated.

Figure 4:
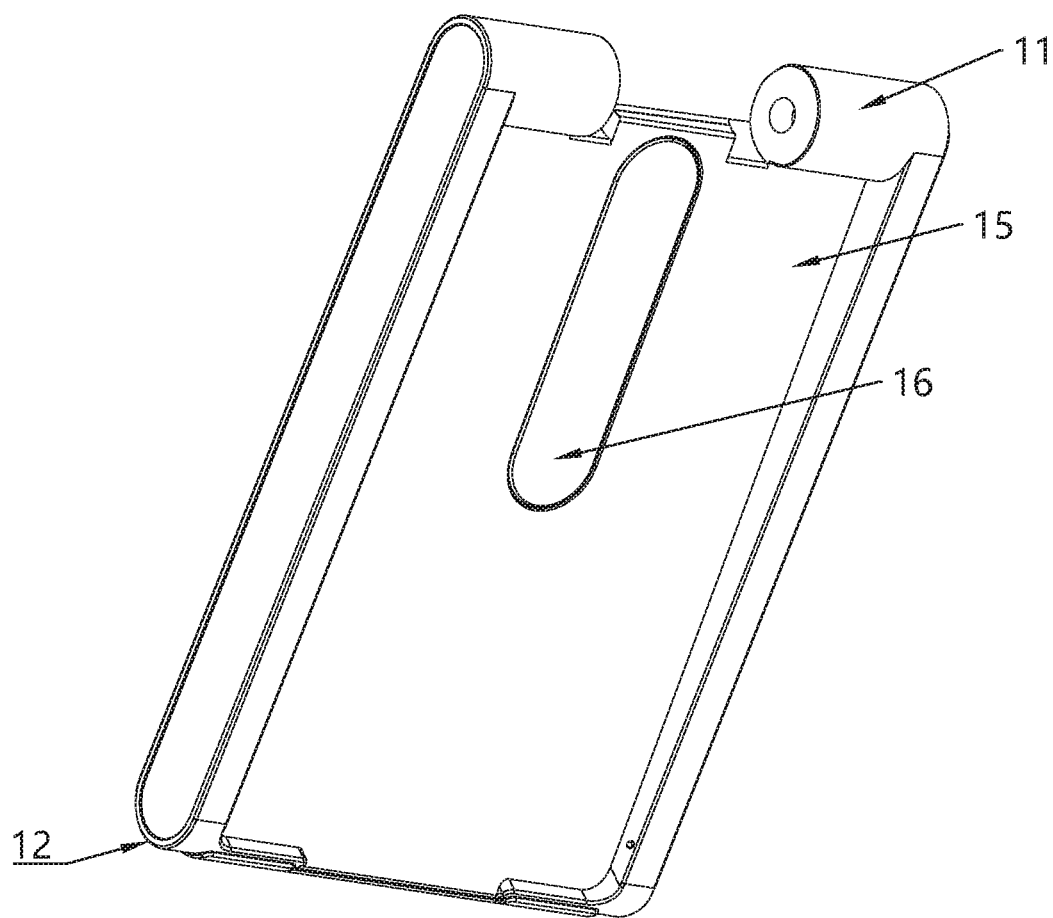
FIG. 4 is a back structural schematic diagram of a front support plate in embodiment 1 of the invention.

As shown in FIG. 2, the rear support plate is gradually decreased in thickness from the upper end 22 to the lower end 23; and the corresponding stowing groove 15 in the back surface of the front support plate is gradually decreased in depth from the upper end to the lower end (as shown in FIG. 4), to store the rear support plate accordingly.

As shown in FIGS. 1, 3, 4, 6 and 7, the mobile phone receiving platform in this embodiment is in sliding connection with the front support plate, and the mobile phone bracket is also provided with a locking structure which can lock the mobile phone receiving platform to prevent sliding. The sliding and locking structure is: the front surface of the front support plate is provided with a sliding groove 14, the shape of each of an upper end 13 of the sliding groove and a lower end 15 of the sliding groove is circle, and the shape of the middle section of the sliding groove is rectangle. The mobile phone receiving platform is provided with a circular pressing area 33, and the surface of the circular pressing area is covered with a silicone layer to improve feel and comfort. A locking rod base 34 is provided in the pressing area, a locking rod 36 is fixed onto the locking rod base, a cavity for the locking rod base to move is formed between the locking rod base and the back surface of the mobile phone receiving platform, a reset spring 35 is provided between the locking rod base and the back surface of the mobile phone receiving platform, and a locking rod cap 37 wider than the main body of the locking rod is provided at the top of the locking rod. The locking rod cap is wider than the middle section of the sliding groove in horizontal width, but is narrower than the upper end and the lower end of the sliding groove; the main body of the locking rod is narrower than the sliding groove in horizontal width, thereby being able to slide in the sliding groove. A cavity is formed between the back surface of the sliding groove and the back surface of the front support plate, and the cavity is used to provide a space for the locking rod cap to move. When pressing the pressing area, the locking rod base pushes the locking rod to move downward, to push the locking rod cap downward to come out from the lower end 15 of the sliding groove and enter the cavity in the back surface of the sliding groove, to unlock. Then, when pressing the pressing area to push upward, the locking rod slides in the sliding groove, and when the locking rod slides to the upper end 13 of the sliding groove, after releasing, the restoring force generated by the reset spring 35 upward pushes the locking rod base, to drive the locking rod cap to enter the upper end 13 of the sliding groove, to lock. When pushing downward the mobile phone receiving platform, the principle is the same. When pressing the pressing area 33, the locking rod cap comes out from the upper end 13 of the sliding groove and enters the cavity in the back surface of the sliding groove, and when the locking rod slides downward to the lower end 15 of the sliding groove, after releasing, the reset spring pushes the locking rod cap to enter the lower end 15 of the sliding groove to lock. The back surface of the front support plate is also provided with a decorative cap 16, and the decorative cap 16 is mainly configured to facilitate assembling, and is sealed after assembling, having beautiful appearance.

As a further improved solution, a coil for wireless charging is provided in the mobile receiving platform.

The above embodiment is a preferred implementation mode of the invention. However, the implementation modes of the invention are not limited by the above embodiment. Any other change, modification, replacement, combination and simplification made without departing from the spiritual essence and principle of the invention shall be equivalent substitution mode, and shall be included within the protection scope of the invention.

The invention claimed is:

1. A mobile phone bracket with a liftable panel, including a front support plate and a rear support plate, wherein the front support plate and the rear support plate are rotationally connected, and the back surface of the front support plate is provided with a stowing groove adapted to the rear support plate in shape and size; when stowed, the rear support plate is trapped into the stowing groove; the front surface of the front support plate is also superimposed with a mobile phone receiving platform which is S-shaped, the mobile phone receiving platform is in sliding connection with the front support plate, and the mobile phone bracket is provided with a locking structure which can lock the mobile phone receiving platform to prevent sliding.

2. The mobile phone bracket with a liftable panel according to claim 1, wherein when the rear support plate is opened, an included angle formed by the front support plate and the rear support plate is less than or equal to 90 degrees.

3. The mobile phone bracket with a liftable panel according to claim 1, wherein an upper end head of the front support plate is arc-shaped.

4. The mobile phone bracket with a liftable panel according to claim 1, wherein a lower end head of the front support plate is arc-shaped.

5. The mobile phone bracket with a liftable panel according to claim 1, wherein an upper end head of the rear support plate is arc-shaped.

6. The mobile phone bracket with a liftable panel according to claim 1, wherein the rear support plate is gradually decreased in thickness from the upper end to the lower end; and the corresponding stowing groove in the back surface of the front support plate is gradually decreased in depth from the upper end to the lower end.

7. The mobile phone bracket with a liftable panel according to claim 1, wherein the front surface of the front support plate is provided with a sliding groove, the shape of each of both ends of the sliding groove is oval or square, the shape of the middle section is rectangle, and the lateral distance between the two ends of the sliding groove is greater than the width of the rectangle.

8. The mobile phone bracket with a liftable panel according to claim 1, wherein the mobile phone receiving platform is provided with a locking rod which cooperates with the sliding groove, slides in the sliding groove, and locks when sliding to the two ends of the sliding groove.

9. The mobile phone bracket with a liftable panel according to claim 7, wherein the mobile phone receiving platform is provided with a locking rod which cooperates with the sliding groove, slides in the sliding groove, and locks when sliding to the two ends of the sliding groove.

10. The mobile phone bracket with a liftable panel according to claim 1, wherein a coil for wireless charging is provided in the mobile phone receiving platform.

* * * * *